US011399517B2

(12) United States Patent
Vaara

(10) Patent No.: US 11,399,517 B2
(45) Date of Patent: Aug. 2, 2022

(54) DEVICE FOR PRICKING THE WAX CAPS OF A HONEYCOMB FRAME

(71) Applicant: PARADISE HONEY OY, Kerkkoo (FI)

(72) Inventor: Juhani Vaara, Kerkkoo (FI)

(73) Assignee: PARADISE HONEY OY, Kerkkoo (FI)

( * ) Notice: Subject to any disclaimer, the term of this patent is extended or adjusted under 35 U.S.C. 154(b) by 607 days.

(21) Appl. No.: 16/347,982

(22) PCT Filed: Nov. 7, 2017

(86) PCT No.: PCT/FI2017/050764
§ 371 (c)(1),
(2) Date: May 7, 2019

(87) PCT Pub. No.: WO2018/083386
PCT Pub. Date: May 11, 2018

(65) Prior Publication Data
US 2019/0289831 A1    Sep. 26, 2019

(30) Foreign Application Priority Data

Nov. 7, 2016    (FI) ................................ U20164216

(51) Int. Cl.
*A01K 59/02* (2006.01)
*A01K 59/06* (2006.01)
(52) U.S. Cl.
CPC .............. *A01K 59/02* (2013.01); *A01K 59/06* (2013.01)

(58) Field of Classification Search
CPC ..................................................... A01K 59/06
See application file for complete search history.

(56) References Cited

U.S. PATENT DOCUMENTS

| | | | | |
|---|---|---|---|---|
| 731,701 | A * | 6/1903 | Miller | A01K 59/02 449/63 |
| 989,138 | A * | 4/1911 | Ferguson | A01K 59/02 449/54 |
| 1,414,260 | A * | 4/1922 | Crawford | A01K 59/04 34/58 |
| 1,861,939 | A | 6/1932 | Root | |
| 2,168,579 | A * | 8/1939 | Perreton | A01K 59/00 53/514 |
| 3,068,496 | A * | 12/1962 | Owens | A01K 59/02 449/55 |

(Continued)

FOREIGN PATENT DOCUMENTS

| | | | | |
|---|---|---|---|---|
| DE | 202015006703 U1 | * | 10/2015 | ............ A01K 59/02 |
| FR | 2583954 A1 | * | 1/1987 | ............ A01K 59/04 |

(Continued)

OTHER PUBLICATIONS

International Search Report and Written Opinion, dated Jan. 31, 2018, from corresponding PCT application No. PCT/FI2017/050764.

*Primary Examiner* — Peter M Poon
*Assistant Examiner* — Morgan T Barlow
(74) *Attorney, Agent, or Firm* — Nixon & Vanderhye

(57) ABSTRACT

Disclosed is a honeycomb frame wax cap pricking device including base frame, spike assemblies and a movement mechanism, wherein the pricking mechanism of the pricking device has a rotatable eccentric mechanism.

14 Claims, 11 Drawing Sheets

(56) References Cited

U.S. PATENT DOCUMENTS

| | | | |
|---|---|---|---|
| 3,293,672 A * | 12/1966 | Gregersenjeromep | ................ A01K 59/02 449/54 |
| 3,388,409 A * | 6/1968 | Hettrick | ................ A01K 59/02 449/55 |
| 4,765,008 A * | 8/1988 | Gunness | ................ A01K 59/02 449/54 |
| 5,295,894 A * | 3/1994 | De Clercq | ............ A01K 59/02 449/54 |
| 9,826,721 B2 | 11/2017 | Anderson et al. | |
| 2016/0330939 A1* | 11/2016 | Vaara | ................ A01K 59/02 |
| 2017/0245476 A2 | 8/2017 | Anderson et al. | |

FOREIGN PATENT DOCUMENTS

| FR | 2833137 A1 * | 6/2003 | ............ A01K 59/02 |
|---|---|---|---|
| SU | 820761 A1 | 4/1981 | |
| WO | 2013/091018 A1 | 6/2013 | |
| WO | 2015/097338 A1 | 7/2015 | |

* cited by examiner

A

Detail A

Detail A

Detail A

DEVICE FOR PRICKING THE WAX CAPS OF A HONEYCOMB FRAME

TECHNICAL FIELD

The subject of this invention is a very compact-sized device for pricking honeycomb frames, which enables rapid removal of honey from honeycombs using a single device. This device for pricking honeycomb frames can be combined so that it can be used with other traditional honeycomb frame uncapping mechanisms.

BACKGROUND AND KNOWN TECHNOLOGY

Traditionally, pricking honeycombs by using spikes with previously known devices is a very slow process, typically involving honeycomb frames being lifted up by a special lifting mechanism one by one from the loading rack and inserted into a pricking device, which then pricks both sides of the honeycomb frames symmetrically. Typically, the spikes penetrate up to a couple of millimeter distance from the wax foundation, and the spikes cause movement to the honey. This effect, which imparts movement to the honey inside the honeycombs, is especially important when honeycomb frames are filled with thixotropic honey, so that the viscosity of the honey is temporarily reduced and the honey can be extracted out from the honeycomb frame. Some major issues with traditional pricking devices are that they are very expensive to purchase and their operating speed is so slow that some beekeepers need to purchase multiple traditional pricking devices so that the pricking process can keep up with other honey extraction processes.

SUMMARY OF THE INVENTION

The goal of this invention is a new kind of device for pricking honeycomb frames, which processes honeycomb frames remarkably faster and is more compact-sized than previously known traditional pricking devices, and also is suitable for being equipped with traditional uncapping mechanisms, thus being more economical than previously known pricking devices.

The device according to the invention is characterized by what is described in the description that follows and claims that accompany this application.

The device according to the invention comprises a base frame, spike assemblies, and a movement mechanism, where the movement mechanism is equipped with a rotating camshaft mechanism.

A device according to one exemplary embodiment of the invention comprises a chain mechanism for moving honeycomb frames, which, according to one preferred embodiment of the invention, also moves the mechanism that carries out the honey pricking. In this embodiment, one electric motor moves the honeycomb frames through the pricking device and the same electric motor also drives the pricking mechanism.

The pricking mechanism according to one preferred embodiment of the invention comprises spike assemblies, with perforation spikes and springs, and also a movement mechanism that provides rotational movement for the spike assemblies.

One such spike assembly comprises inner and outer base frame plates, which are connected to each other, and both of which are equipped with holes for the spikes. The inner base frame plate is located more near the honeycomb frame and the inner base frame plate is fastened for instance using bolts to the outer base frame plate. Between the inner and outer base frame plates, there is a space for spikes so that an end of the spike is pushed through a positioning hole of the inner base frame plate up to a shoulder of the spike, and an end of the spike is pushed to a positioning hole of the outer base frame plate. The spike stays in this position because a part of the spike, which is located inside the two base frame plates, is positioned inside a cross-sectionally circular compression spring. This compression spring pushes the shoulder of the spike towards the inner base frame plate, but the spike can move inside the hole of the inner base frame plate only up to the shoulder of the spike because the shoulder is larger than the hole diameter and thus cannot fit through the hole. The compression spring also cannot move out from the spike assembly through the hole of the outer base frame plate because the outer diameter of the spring is larger than the diameter of this hole. Because the inner and the outer base frame plates are fastened to each other, the spike assembly is held together while allowing the spike to move, if necessary, towards the outer base frame plate all the way up to the maximum compression length of the spring.

In one particular example of an embodiment of the invention, the pricking device is positioned underneath a set of traditional uncapping blades. Of course, the pricking device can also be used separately without the uncapping blades. In this example, opening and pricking of honeycomb cells can be carried out very fast because the honeycomb cells are pricked while the honeycomb frame is moving inside the device and does not require the honeycomb frame to be stationary. By using this structure, it is possible to achieve uncapping and pricking speed of over twenty frames in a minute, which has been completely impossible by using other previously known pricking devices.

Also in this exemplary embodiment of the invention, the movement mechanism, which produces motion for the pricking mechanism, is implemented so as to pivot the spike assemblies with the help of slide bearings and rod parts connected to rotating shafts, the rotating shafts being connected to sprocket wheels which together form a camshaft mechanism. A transfer chain, which provides motion for the camshaft mechanism, is connected to the sprocket wheels as follows: a main shaft goes through the whole pricking device, and to which are connected driving sprocket wheels on both outer sides of the base frame of the device, and these sprocket wheels drive the pricking mechanism of the device. Also on both inner sides of the base frame of the device, driving sprocket wheels are connected to the main shaft for driving the frame transferring mechanism. With this implementation, only one electric motor drives both mechanisms while rotating one main shaft.

The rotational motion of the pricking mechanism is implemented in this example so that the spike assemblies and the spikes move along the same direction as the honeycomb frame when the spikes perforate the honeycomb frame surface. This is implemented by connecting the rotation axles of each spike assembly to a transfer chain located outside the base frame of the device so that all the rotation axles, which are connected to the same spike assembly, always have the same rotation direction. A spike assembly is pivoted to two rotation axles on both sides of the pricking device, so the total amount of rotation axles for one spike assembly is four. The axles are aligned on top of each other in the same line vertically on both sides of the pricking device.

The frame transfer mechanism is connected so that a honeycomb frame moves between two uncapping blades, which are positioned symmetrically on both sides of the honeycomb frame, and right after the uncapping blades, the honeycomb frame moves between two spike assemblies; i.e., the honeycomb frame goes through the pricking mechanism, which is located underneath the uncapping blades. The pricking mechanism is also symmetric in respect to the passing honeycomb frame. So, the uncapping blades cut off the cappings symmetrically from both sides of the honeycomb frame, and after this the spikes, which are spring loaded and located in the spike assemblies, perforate inside the honeycombs symmetrically on both sides of the honeycomb frame.

Also in the previously mentioned example, the spikes are positioned inside the base plates of the spike assemblies so that each spike is loaded by one spring. Each spring pushes each spike against a base plate of spike assembly, which is located nearer the passing honeycomb frame. Then while loaded, the spike moves back, if the force pushing the spike is greater than the force created by the spring. This function prevents the spike from possibly breaking and also prevents any possible damage occurring to the honeycomb frame.

In the non-limiting, example embodiments of the invention described herein, the distribution and quantity of spikes in the spike assemblies is the same as the distribution and quantity of honeycomb frame cells. This distribution and quantity of spikes could be different, of course.

In one particular exemplary embodiment of the invention, the pricking mechanism is not connected to a honeycomb frame transfer mechanism. Instead, it is a separate mechanism located outside the base frame of the device. For this example, the honeycomb frame is stationary while it is pricked, and also the rotating movement of the pricking mechanism is positioned outside of the base frame of the device, and inside this base frame the spike assemblies move only in a horizontal direction back and forth symmetrically in respect to the direction of motion of the through passing honeycomb frame. One particular notable feature of this example is that the device can be built to be lower than in the case of the prior example discussed above. For this example, the pricking mechanism is driven by its own separate electric motor.

As a special case, this second exemplary embodiment can be implemented also so that the spike assemblies move also in addition to the horizontal direction, in the vertical direction. This way the resulting direction of movement is at an angle, but close to horizontally.

In the accompanying examples of different embodiments of the invention described herein, the source of power for driving the mechanisms of the invention is an electric motor, but based on the non-limiting examples of different embodiments of the invention described herein, it is clear that a device according to the invention can be implemented also to be pneumatic, hydraulic or for example the pricking mechanism could be driven by forces created by magnets, or possibly the pricking mechanism could be manually hand driven.

In the non-limiting examples of different embodiments described herein, the spike and the spring are separate parts, but they could be one part, in which case the part is rigid and shaped as a spike for the portion of the part which perforates the honeycomb, and is compressible for the portion of the part which is located inside the spike assembly. In this case, a significant savings in manufacturing costs is achieved when no separate spike is needed. To be taken into account is that in one exemplary device according to the invention, there are thousands of spikes and also thousands of springs. For example in the devices shown in the examples described herein, there are 6000 spikes and therefore also 6000 springs. Due to this structure, it is possible to pump out honey from the honeycombs through a center hole located in the center of the spring element. In this case, honey comes out in the end through the holes of the outer base frame plate of the spike assembly.

For the examples of different embodiments of the device according to the invention, it is notable also that these are dimensioned so that the spikes of the pricking mechanism never contact the top and lower bars and side bars of the honeycomb frame, which reduces remarkably the risk of possible breakage of the spikes and thus makes the devices according to the invention remarkably more reliable to use than the previously known devices. Due to this fact, also, the possibility that the honeycomb frames may contain nails does not have any effect on the functioning of the device according to the invention. Although the spikes presented in the examples of the embodiments described herein never contact the bars of the honeycomb frame, this contact may occur if a honeycomb frame, shorter than the frame size for which that particular device was designed for, is inserted into the device according to the invention. That also is not a problem, because the spikes can move, if needed, towards the inside of the spike assemblies in the case some spikes happen to contact any of the bars of the honeycomb frame. In addition, the force pushing the honeycomb frame by each spike can be adjusted by changing the spring constant of the compression spring, which compression spring holds the spike in correct position.

The material of the honeycomb frame does not affect in any way the functioning of the device according to the invention. In addition, any nails possibly fastened to the bars of the honeycomb frame or the so-called Hoffmann extension of the honeycomb frame do not affect in any way the functioning of the device according to the invention. Also, due to the spring loading of the spikes of the pricking mechanism, different thicknesses of the honeycomb frames do not affect in any way the functioning of the device.

The device according to the invention can be manufactured to be used in an up-down direction, down-up direction, or, for example, to be used in a side-to-side horizontal direction of the top bar of the honeycomb frame or in a side-ways direction when the honeycomb frame is "tilted" horizontally.

In addition, a honey processing system according to the invention, for example, for a honey extraction line or for an uncapping line, would in a non-limiting way include a pricking device according to an embodiment of this invention.

It must be said that a spike assembly according to the invention, inside which the springs are located and partially inside which are located the spikes, can be equipped with heating according to one particular non-limiting embodiment. For instance, a water heating piping located outside or inside the spike assembly or, for instance, an electrical heating resistance, are suitable for heating elements. According to one non-limiting variation of an exemplary embodiment, infrared heating can be used solely or in addition to other heating types.

Also, it must be said that in all the different embodiments of the pricking mechanism of the invention, the force which the pricking mechanism uses to perforate the honey cells is easily adjustable by changing the parameters of the power source, for instance in the case of an electric motor by changing the parameters of an inverter for controlling an electric motor or by changing more or less powerful electric motor to the device according to the invention.

It must be mentioned also and in addition that in the non-limiting, exemplary embodiments of the invention described herein, the components of the invention are manufactured of stainless steel. Of course, for many of the components, for instance for a spike of a spike assembly, suitable manufacturing material is also for instance food grade approved plastics.

The non-limiting exemplary embodiments of the invention are presented in pictures and in parts of the description text, which parts refer to the drawings, and non-limiting embodiments are also presented as other examples and in the claims. Further, the example embodiments of the invention are suitable for combining with each other when the combining is suitable.

BRIEF DESCRIPTION OF DRAWINGS

Next the invention is explained more in detail with the help of some non-limiting examples of different embodiments of the invention by referring to accompanied drawings, in which:

FIGS. 3, 3A, 3B: a sectioned view example (FIG. 3) of a detail according to the invention and a front view (FIG. 3B) of a device according to the invention.

Figure 1:
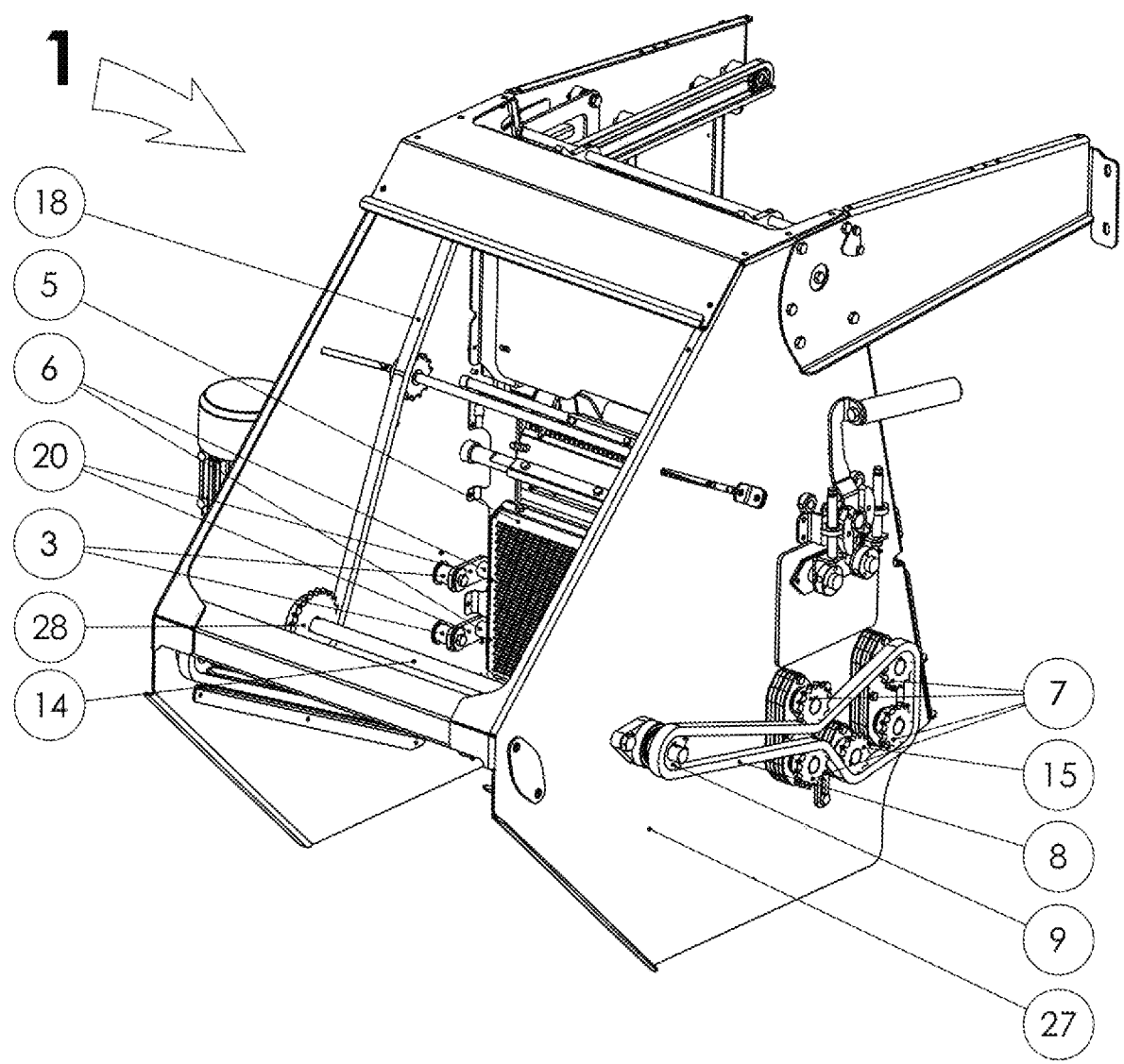
FIG. 1: an embodiment of the pricking device presented as a view from the side and slightly in an angle.
Figure 2:
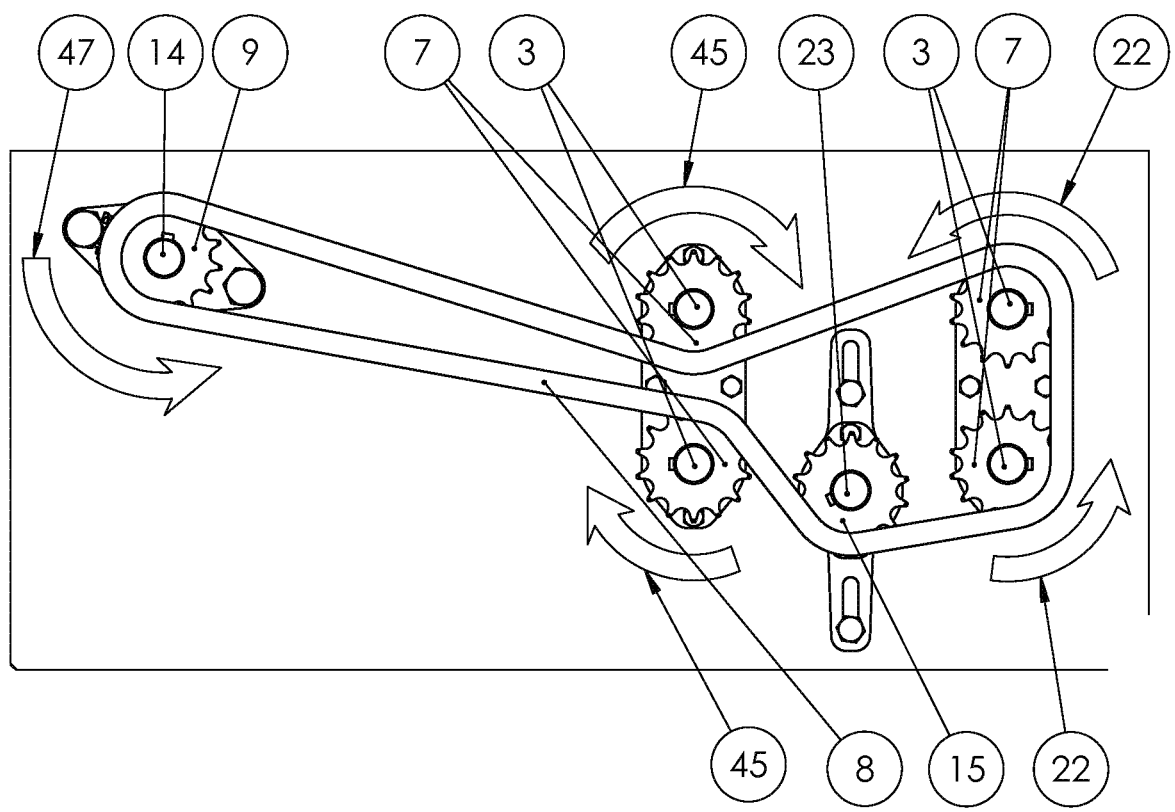
FIG. 2: a view from the side of the movement mechanism of the pricking mechanism of the device according to the invention, wherein the movement mechanism is implemented by using a transfer chain.
Figure 3:
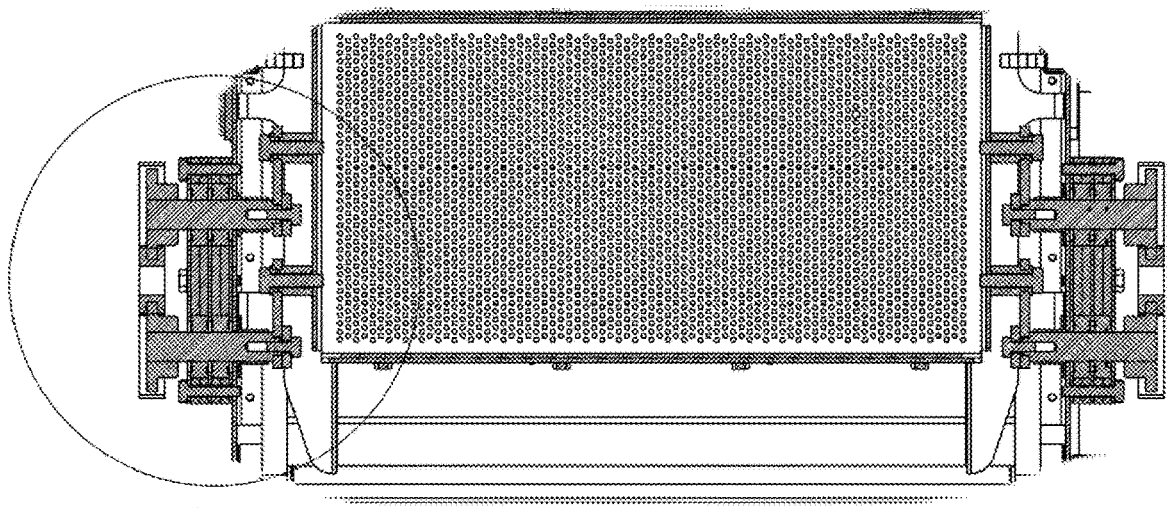
Figure 3:
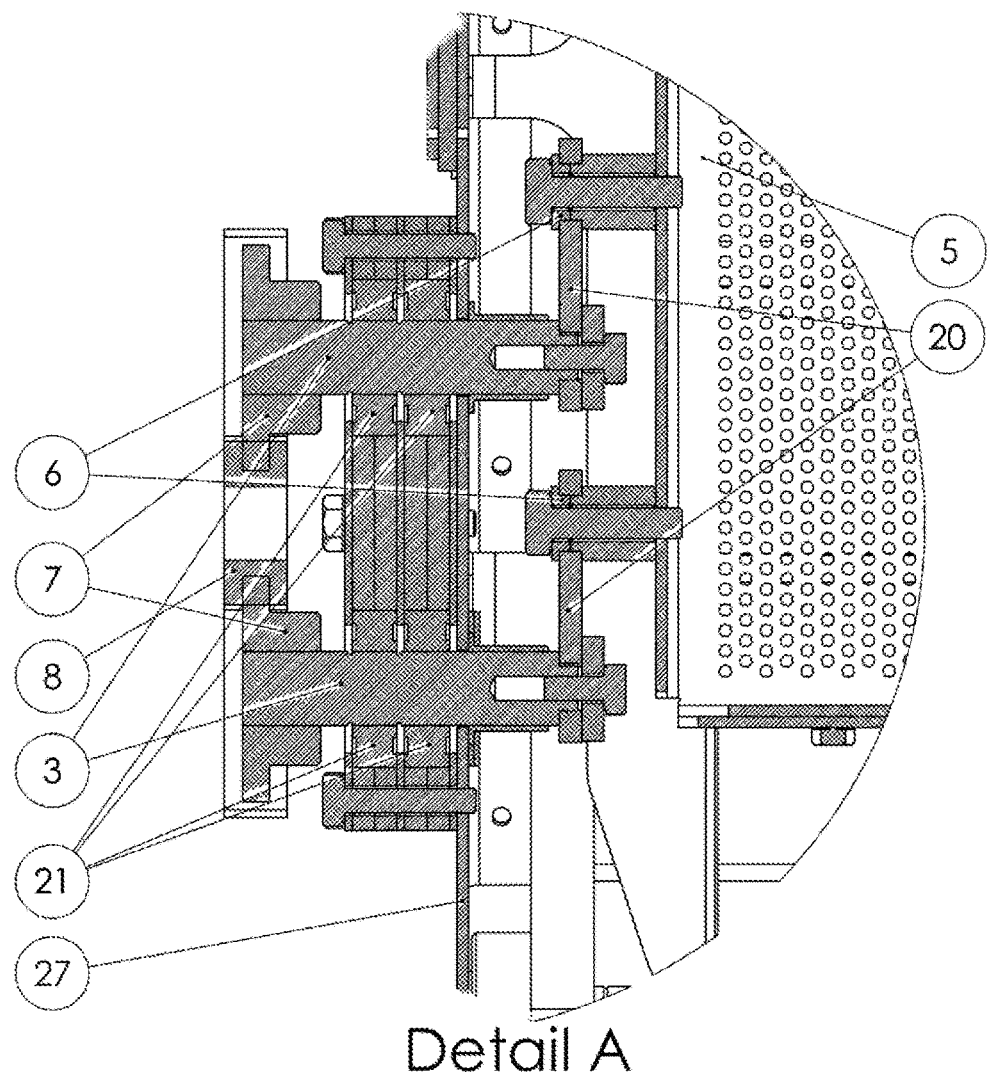
Figure 3B:
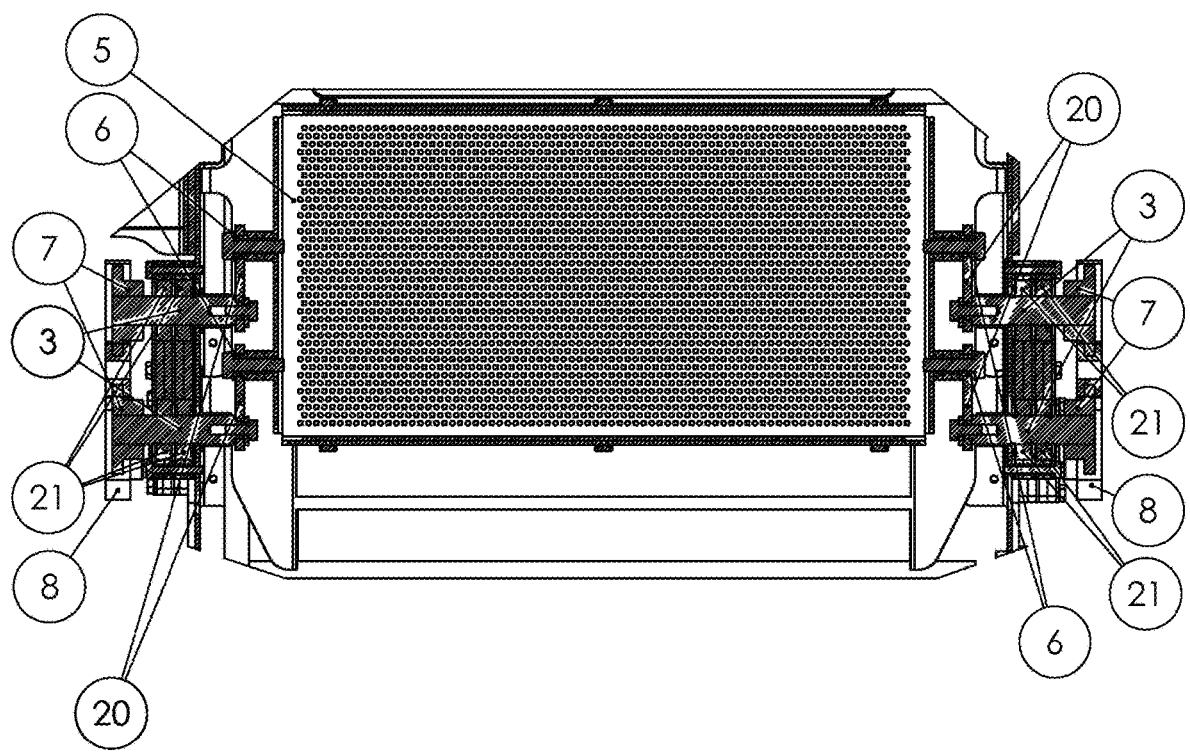
Figure 4:
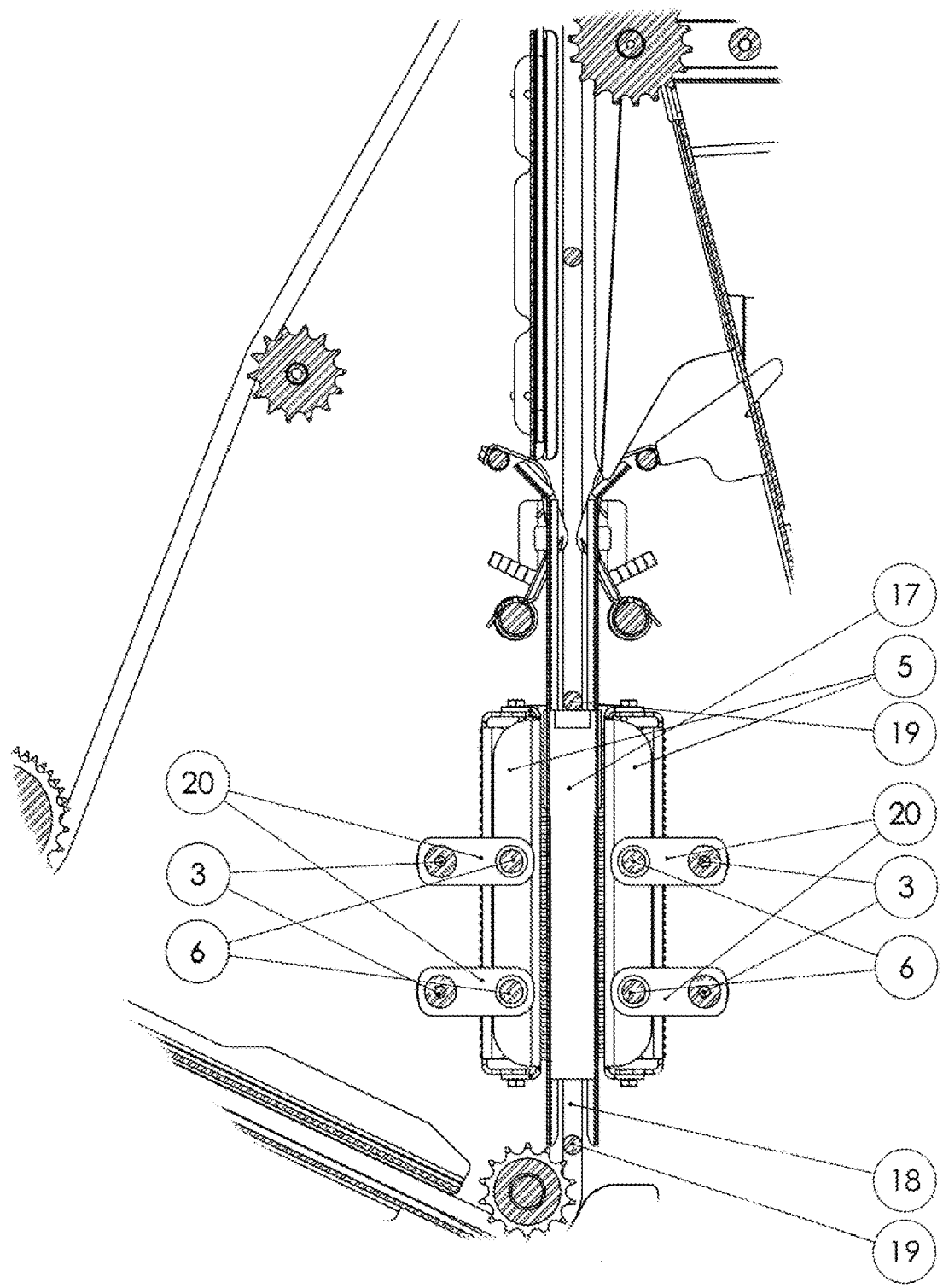
FIG. 4: a sectioned view of an example of an embodiment of a device according to the invention viewed directly from the side of the device, wherein the spike assemblies are not sectioned and in addition the spikes are not set inside the honeycombs of the honeycomb frame.
Figure 5:
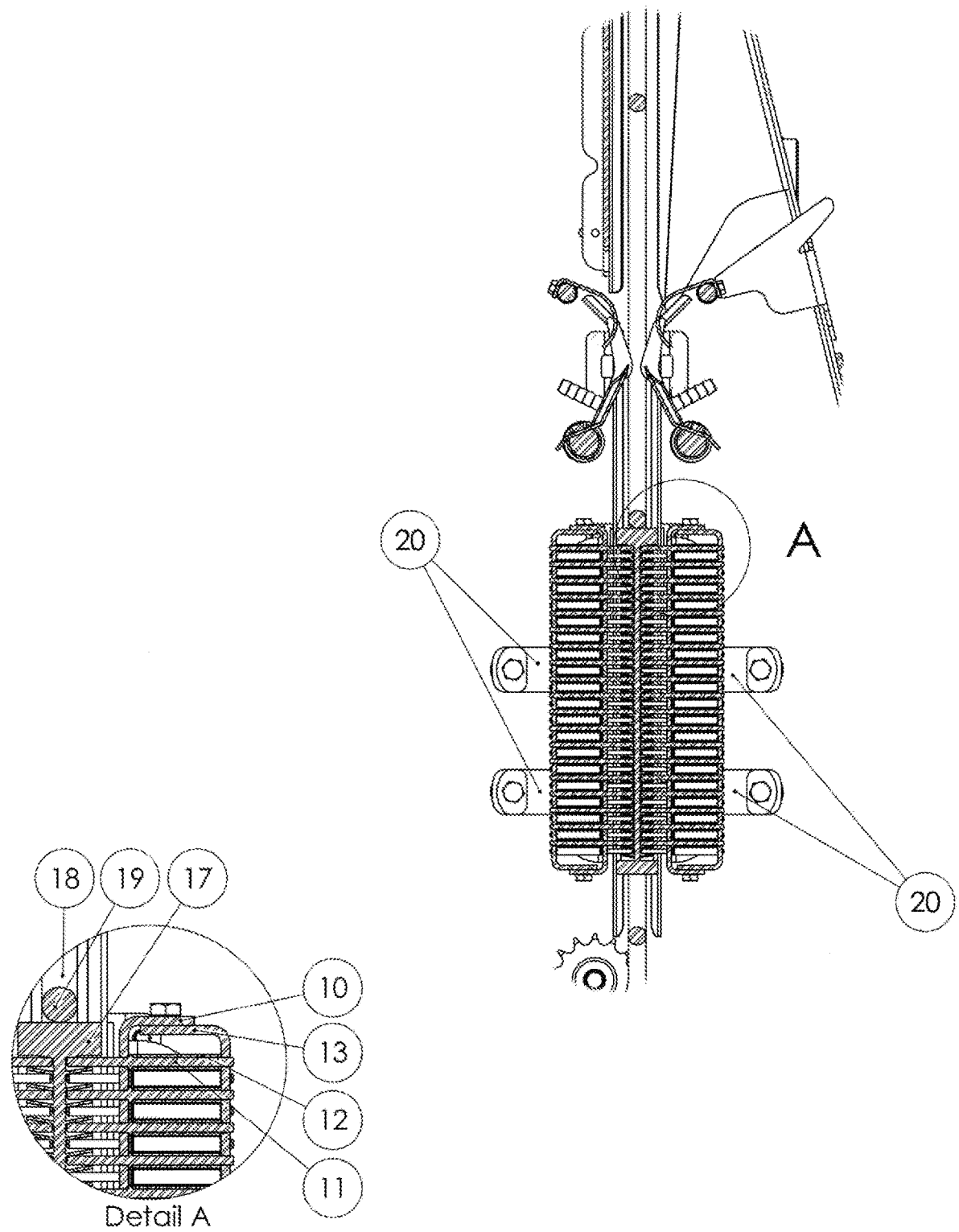
FIG. 5: section view, viewed from the side, of an example of an embodiment of a device according to the invention, in which drawing the spike assemblies are sectioned and the spikes are set inside the honeycombs of the honeycomb frame.
Figure 6:
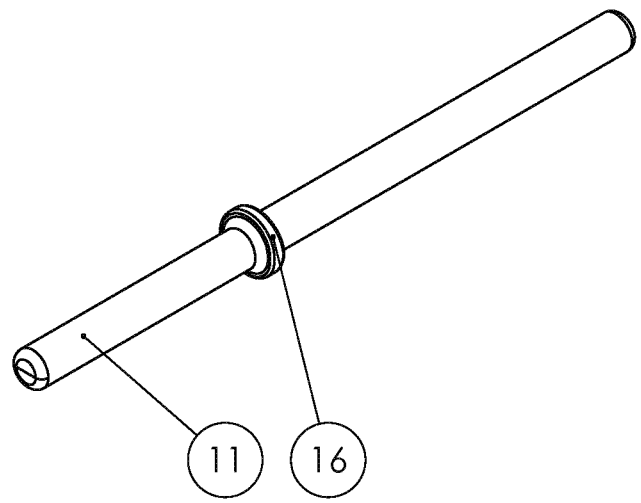
FIG. 6: one example of a spike of a spike assembly viewed from the side in slight angle.
Figure 7:
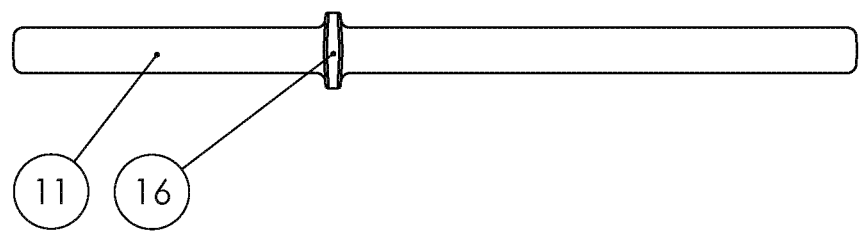
FIG. 7: a direct side view of one example of a spike of a spike assembly.

It is mentioned in addition that in the accompanied and above referred drawings all the transfer chains have been presented by using a simplified appearance in order to maintain a good readability of each drawing. The dimensions and proportions of the shown example embodiments of the invention are not restricted only to be similar as shown in the accompanying examples.

DETAILED DESCRIPTION OF INVENTION

One example of an embodiment of the device 1 according to the invention, which is shown in drawings FIG. 1 to FIG. 7, comprises a base frame 27 of the pricking device 1 and a camshaft type and rotating pricker mechanism, which is symmetrical in respect to the direction of movement of the honeycomb frame, and a honeycomb frame 17 transfer mechanism inside the device 1.

In the drawings FIG. 1 to FIG. 7 is shown one example of an embodiment of the invention, in which into to the device 1 is integrated traditional honeycomb frame uncapping blades.

According to one example of an embodiment of the invention, a cappings pricker mechanism comprises two spike assemblies 5, eight axles 3, eight connecting rods 20, eight slide bearing pivots 6, eight sprocket wheels 7, two transfer chains 8, and two driving sprocket wheels 9, whereby these sprocket wheels 9 are fastened on to a drive shaft 14. In addition, in the example of the drawing FIG. 1 the camshaft type pricker mechanism also includes an adjusting sprocket wheel 15 on both sides of the device 1 for tightening the transfer chains 8.

According to one example of an embodiment of the invention, the cappings pricker mechanism comprises two spike assemblies 5, eight axles 3, eight connecting rods 20, eight slide bearing pivots 6, eight sprocket wheels 7, two transfer chains 8, which transfer chains 8 move the spike assemblies 5, and in addition, two driving sprocket wheels 9, the driving sprocket wheels 9 being fastened on to a drive shaft 14. The drive shaft 14 can be also the main shaft according to one example of an embodiment of the invention. In addition, in the example shown in drawing FIG. 1, the camshaft-type movement mechanism of the honeycomb frame 17 cappings pricker mechanism includes also an adjusting sprocket wheel 15 on both sides of the device 1 for tightening the transfer chains 8, which transfer chains 8 provide motion for the spike assemblies 5.

The adjusting sprocket wheel 15 is positioned symmetrically in respect to both sides of the pricker mechanism to the center between two lower axles 3 of the two halves of the pricker mechanism. The device 1 according to the invention can be implemented also without the need for adjusting sprocket wheels 15 on both sides of the device 1, or the adjusting sprocket wheel 15 can be positioned to a location where it is suitable for providing the same function.

So, the driving sprocket wheels 9 of the camshaft type and rotating pricker mechanism of device 1 according to a particular example of an embodiment of this invention are located outside the device 1 on both sides of the base frame 27 of the device 1 and are fastened to the main shaft 14. The camshaft type pricker mechanism outside the base frame 27 of the device 1 is implemented as follows: the axles 3 are pivoted symmetrically on both sides of the base frame 27 of the device 1, four axles 3 on each side. Each axle 3 is rotatably mounted in this example using two groove ball bearings 21 to the base frame 27. Retaining rings hold the axles 3 in place so that the axles 3 cannot move in the direction of the mounting center hole of the groove ball bearing 21. This mounting could be implemented of course in some other way, for instance according to one variant of an exemplary embodiment, by notching that part of the surface of the axle 3 into which the groove ball bearing is mounted, in which case possibly the retaining rings would not be needed necessarily at all. The structure of the portion of the pricker mechanism, which is located inside the base frame 27 of the device 1, is symmetric in respect to the direction of motion of the honeycomb frame 17 moving through the pricker mechanism. One such symmetric half of the portion of the pricker mechanism, which is located inside the base frame 27, comprises four axles 3, four connecting rods 20, four slide bearing sleeves 6, and one spike assembly 5. One spike assembly 5 is pivoted from both sides to the base frame 27 with the help of two axles 3, two slide bearing sleeves 6, and two connecting rods 20. These two axles 3 are aligned vertically. The axles 3 extend from inside the base frame 27 to outside of the base frame 27 so that to each end of each axle 3, each end located outside the base frame 27, one sprocket wheel 7 is mounted. To the sprocket wheels 7 is connected a transfer chain 8 in a special manner specified by a variant of an example embodiment. Due to this particular arrangement, all the sprocket wheels 7, which are connected to the same spike assembly 5, rotate in the same direction. According to an example embodiment of the invention, the sprocket wheels 7 are connected to the transfer chain, which moves the spike assemblies 5. Due to this movement direction, a spike assembly is in the same angular position in respect to the movement direction of the honeycomb frame 17 all the time during the rotational movement of the spike assembly, which movement occurs inside the base frame 27. This particular angular position is vertical in the accompanying examples, meaning that the angular position is the same direction as the direction of motion of the honeycomb frame 17. This means that the spikes 11 are always horizontal according to an exemplary embodiment. According to a particular exemplary embodiment, a spike assembly 5 and its mounting to device 1 is easy to implement also so that the angular position of the spikes 11 is for example at a slight 5 to 25 degree angle in respect to the direction of motion of the honeycomb frame 17.

According to one particular example of an embodiment of the invention, the transfer chain of the movement mechanism which moves the spike assemblies is transfer chain 8. According to this non-limiting example of the device according to the invention, the transfer chain 8 is connected to sprocket wheels 7 and to driving sprocket wheel 9 on the left side and outside of the base frame 27 of the device 1 as follows: chain 8 is connected to pass outside the pair of sprocket wheels 7 of first spike assembly 5 and to pass between the pair of sprocket wheels 7 of the second spike assembly 5, in which case the pair of sprocket wheels mounted on the first spike assembly 5 both rotate counterclockwise according to the direction shown by arrow 22 and the pair of sprocket wheels mounted to the second spike assembly both rotate clockwise according to direction shown by arrow 45, while the drive shaft 14 rotates counterclockwise according to the direction shown by arrow 47. The arrangement of chain 8 on the right side of the base frame is mirrored in respect to the centerline of the base frame and compared to the before-mentioned arrangement wherein the chain 8 is on the left side. In drawing FIG. 2 there is an axle 23 presented for the adjusting sprocket wheel 15 to be rotatably mounted on.

According to an exemplary embodiment of the invention the transfer chain 8 is a first transfer chain of the mechanism which moves the spike assemblies 5. According to a particular exemplary embodiment of the invention the device may also be equipped with a second transfer chain for moving a spike assembly.

It is also notable for this example of the device 1 according to the invention that the length of the frame space in a transfer chain 18, where this frame space is the distance between two adjacent frame pusher bars 19 and which are connected to the transfer chain 18, and into which space a honeycomb frame 17 is inserted in the device 1, is the same as the distance travelled by a slide bearing sleeve 6, which is pivoted to the connecting rod 20, when a connecting rod 20 rotates one full cycle around axle 3. According to another exemplary embodiment, the distance travelled by a slide bearing sleeve 6 when axle 3 rotates one full cycle can be of course different. According to an embodiment of the invention, for example, a transmission and/or a gear can be used to produce the motion required by the described function.

It is also notable for this example of the invention that the driving sprocket wheel 9 of the camshaft-type pricker mechanism and the driving sprocket wheel 28, where the driving sprocket wheel 28 drives the honeycomb frame 17 transfer mechanism, are dimensioned relative to each other so that the honeycomb frame 17 transfer chain 18 moves forwards exactly a distance of one frame space while the pricker mechanism rotates one full cycle. This way while the transfer chain 18 of the honeycomb frame 17 transfer mechanism moves forward exactly a distance of one frame space, the connecting rod rotates exactly one full cycle around the axle 3, in other words meaning that the pricker mechanism rotates one full cycle. Due to this fact, by connecting the transfer chain 18 to a certain position in respect to the position of transfer chain 8, it can be made sure that pricker mechanism perforates the cappings of the honey frame in the same area for all the honey frames, which honey frames travel through the device 1. According to an embodiment of the invention, the transfer chain is a transfer chain for transfer mechanism for certain frames. According to a particular embodiment, a transmission and/or a gear can be used for producing the movements for described functions.

According to an embodiment of the invention, the sprocket wheel 28 is the driving sprocket wheel 28 for certain frames transferring mechanism. The location of this sprocket wheel when mounted on the drive shaft, is demonstrated also with the help of an exemplary embodiment shown, for instance, in drawing FIG. 1.

In the accompanying exemplary embodiments of the invention described herein, the honeycomb frame 17 moves in the device 1 in a direction from up to down through the uncapping mechanism and pricker mechanism, but it is clear that a device equipped with this present invention can be made to function also for example in a direction from down to up or for example in a side-to-side direction of a honey frame or in a forward facing direction when the frame is tilted horizontal and is moving forwards.

In one example of a spike assembly 5, it comprises essentially the inner base frame plate 10, spikes 11, springs 12 and an outer base frame plate 13. In the inner base frame plate 10, there is a hole for each spike 11. In the accompanied examples, the outer base frame plate 13 is equipped with a hole for each spike 11. In this example a suitable size for the hole diameter is a couple of tenths of a millimeter larger than the diameter of the spike 11. This way the spike 11 does not get stuck in either of the two holes while sliding inside these holes. As mentioned, in the exemplary embodiments herein, the spikes 11 are positioned inside the circular holes of the base frame plates 10 and 13. According to one variant example of a non-limiting embodiment, the spikes 11 can be positioned for example to oval shaped holes to both or to one of the base frame plates 10 and 13, in which case the device 1 would permit a honeycomb frame 17 to move in a slight angle through the pricker mechanism.

In the exemplary embodiments herein, the spikes 11 of the spike assembly 5 are round shaped and they are equipped with a shoulder 16 in a precisely defined position, which shoulder 16 prevents the spike 11 from sliding out from an assembled spike assembly 5. In addition, in the accompanied examples the edges of both ends of the spike 11 are rounded. According to one variant of an embodiment, the edges in the ends of the spike 11 are sharp, or they could be equipped with a small extra shoulder, which would agitate the honey more. In one variant of an embodiment of the invention, a spring 12 presses against the shoulder 16 of the spike 11, the spring 12 being of compression spring type in the non-limiting exemplary embodiments herein. The spring 12 is dimensioned so that there is play between the spring 12 and the spike 11 located partially inside the spring 12, this play allowing the spike 11 to slide against the spring 12, while the spring 12 is compressing, without the spike 11 and the spring 12 getting stuck to each other. Occasionally there is a need for this sliding of the spike 11 towards the inside of the inner base frame plate 10. This possibility is there just in case something hard comes in the way of the spike 11 while it perforates inside the honeycomb frame 17 and, if the spike 11 could not move backwards, it could possibly suffer breakage. The sliding of the spike 11 back towards the inside of the spike assembly can be initiated only by a force greater than the force generated by the spring 12, in which case normally the spike 11 would not move in respect to the base frame plates of the spike assembly 5.

In the cases of the example embodiments described herein, the spike assemblies 5 are not necessarily heated to be warmer than the environment. Still, it is clear based on the described exemplary embodiments of the invention that, if necessary, a spike assembly 5 can be for instance equipped with a water heating piping installed either outside or inside the spike assembly 5, or it can be equipped for instance with an infrared heater system to enhance the perforation effect when perforating the wax cappings, which is based on the softening of beeswax due to warming.

Figure 8:
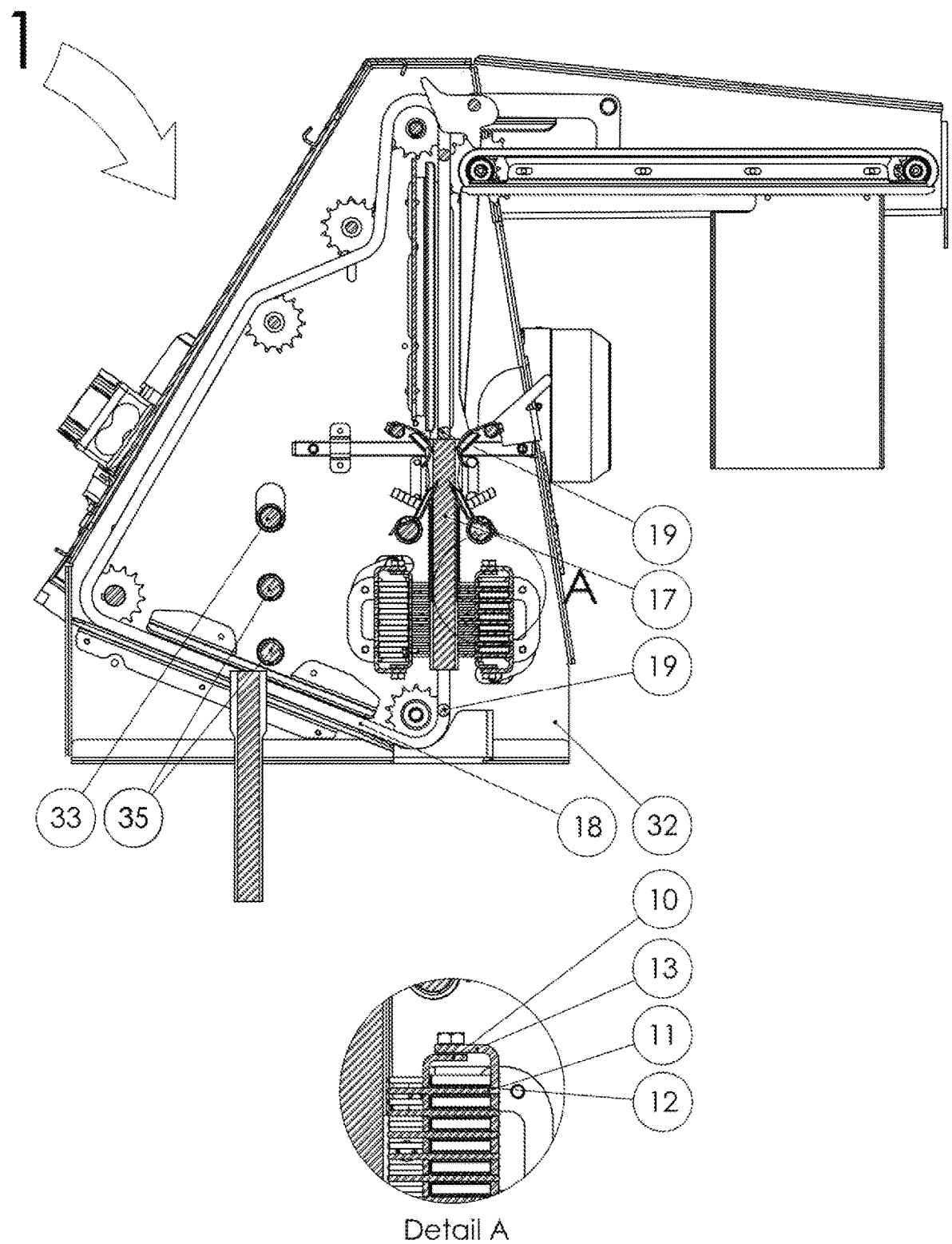
FIG. 8: a side view of a sectioned view of another example of an embodiment of the invention.
Figure 9:
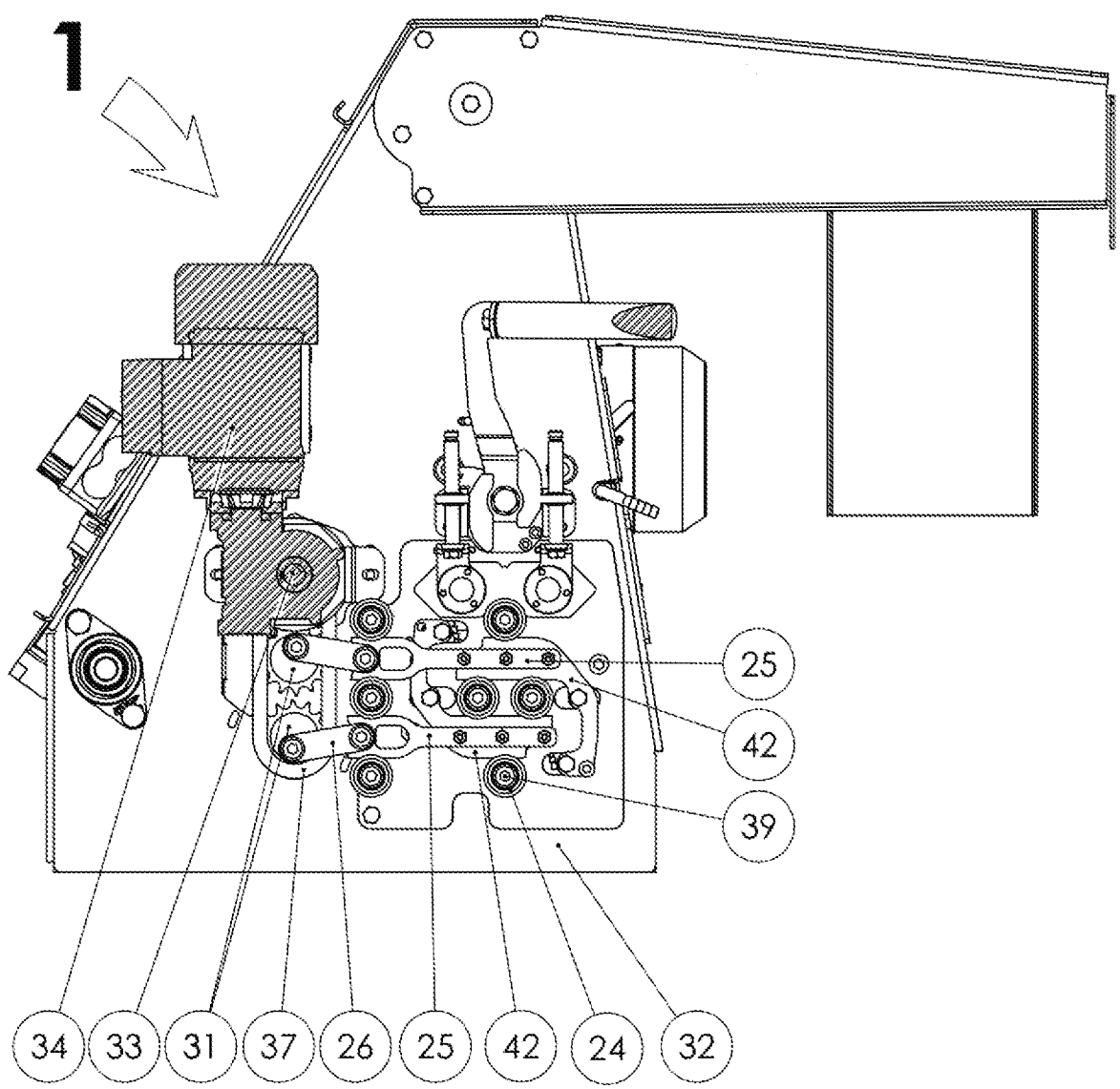
FIG. 9: a partially sectioned side view of the embodiment of the invention shown in FIG. 8.
Figure 10:
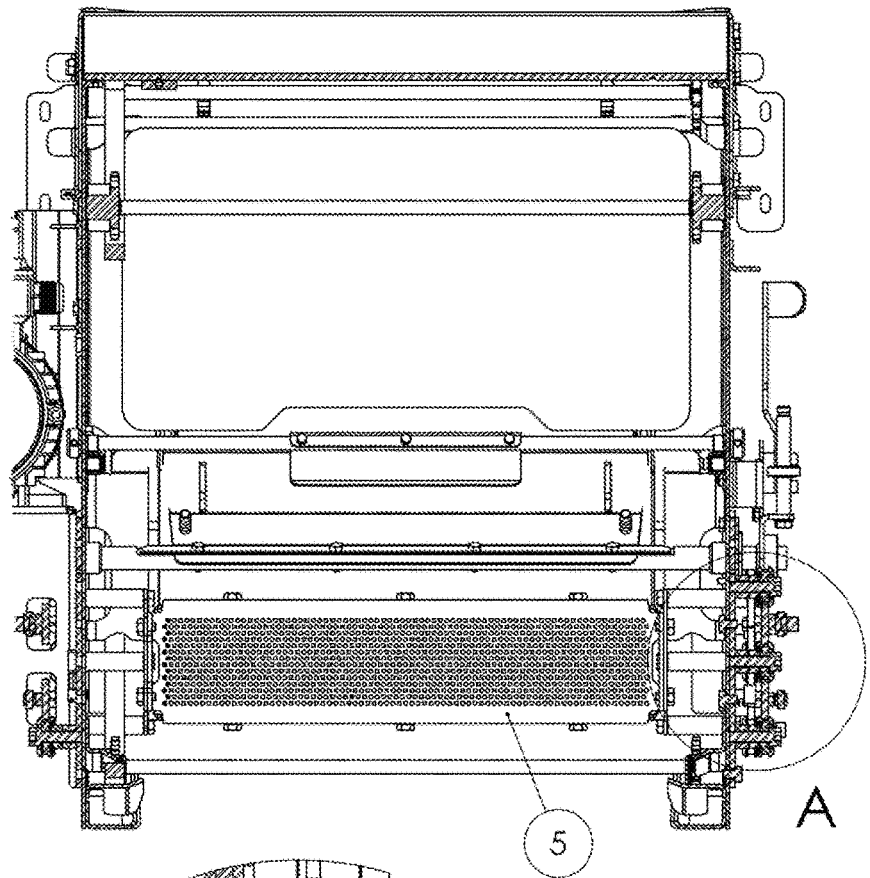
FIG. 10: a sectioned front view of the example of the invention shown in FIG. 8.
Figure 10:
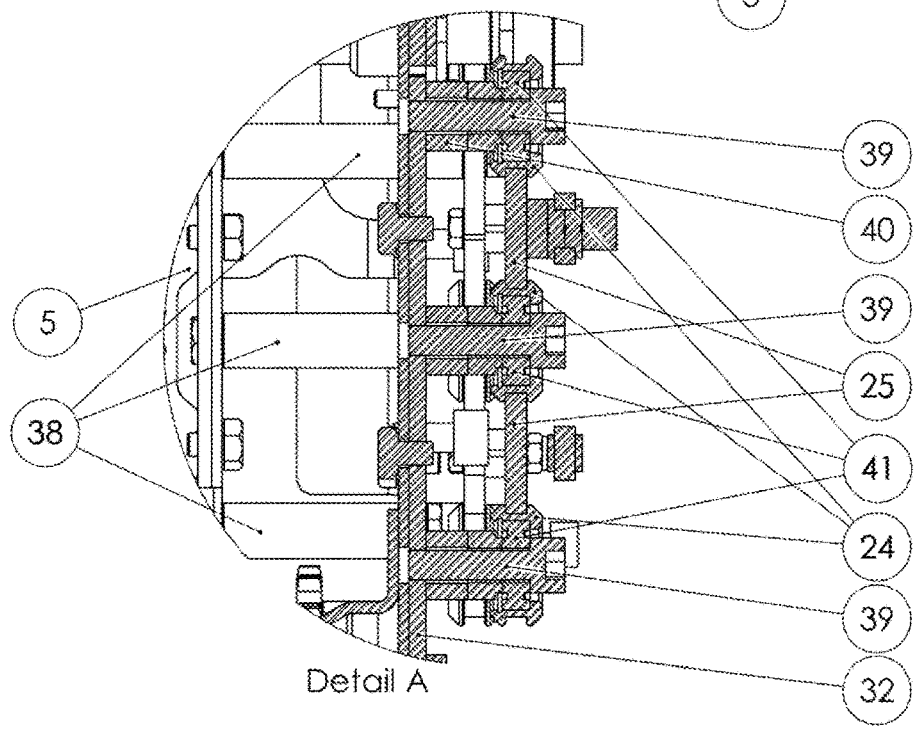

The rotational motion of the camshaft mechanism of the pricker mechanism, of a particular exemplary embodiment of the invention shown in drawings FIG. 8 to FIG. 10, occurs outside the device according to the invention and this rotational motion is transmitted to the spike assemblies 5 with the help of rigid support rails 25, these support rails 25 being supported with roller wheels 24, and these support rails 25 allowing only horizontal movement back and forth for the spike assemblies 5. In the case of this structure, a honeycomb frame 17 is stationary during the perforation motion and thus also the pricker motion mechanism requires its own power source, for instance a second electric motor. Due to this fact, the pricker mechanism for frames 17 takes less space inside the pricker device 1, because the camshaft type motion occurs outside the pricker device 1 and thus it is not needed to reserve space for that camshaft type motion inside the device 1. Also, due to this structure, if necessary, the cappings surface of the same honeycomb frame 17 can be perforated/pricked multiple times during one processing event of the frame 17. Also, due to this structure the base frame 32 can be built to be lower (than in the case of another different structure), because the path of motion of the spike assemblies 5 is smaller, and also the spike assemblies 5 can be built to be lower in height and thus containing less spikes 11 and springs 12 due to the fact that pricking can be done for different portions of the honeycombs of the honeycomb frames 17 multiple times. This on the other hand requires software for controlling the two electric motors according to the procedure.

Figure 11:
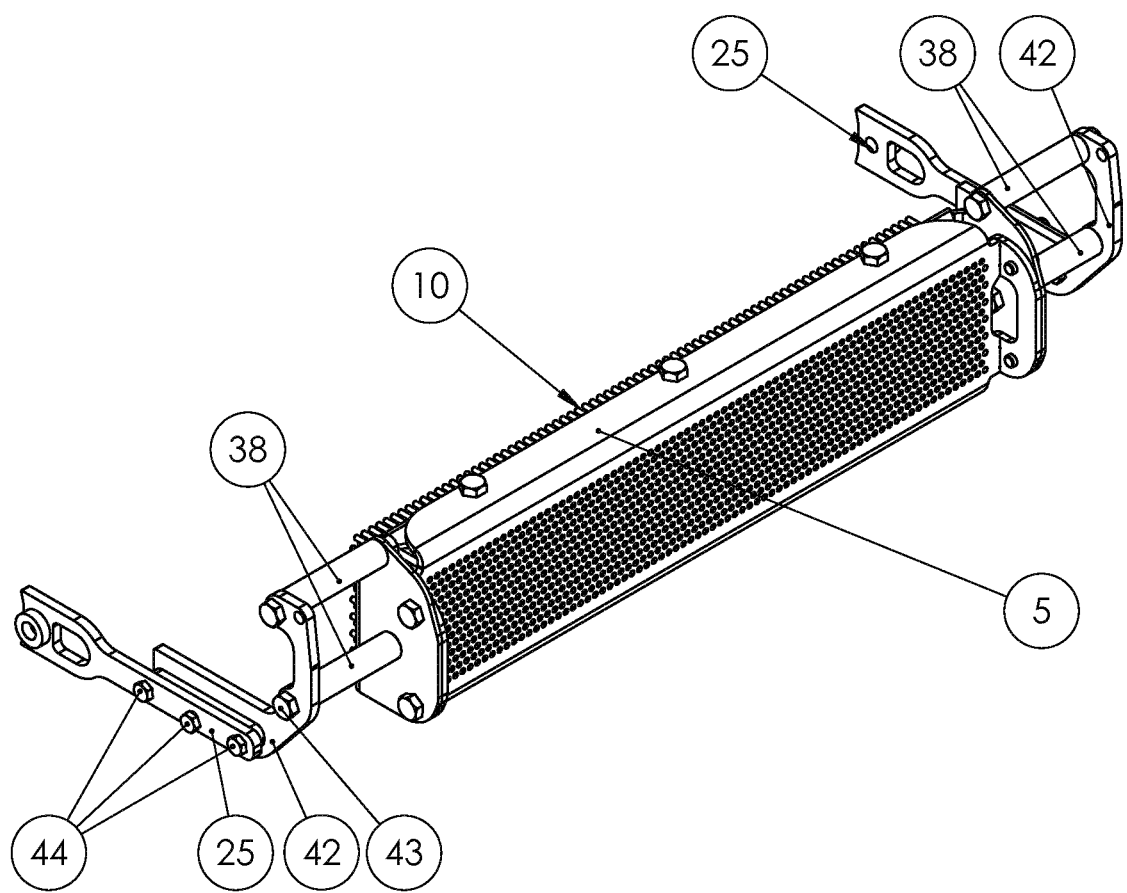
FIG. 11: an example of a spike assembly with guiding rails attached, which spike assembly moves in a horizontal direction in a translational way (this example spike assembly is included in the example shown in FIG. 8).

In the example embodiment of the invention shown in drawings FIG. 8 to FIG. 10, the spike assembly 5 and the guide rails 25, which are attached to the spike assembly 5, are presented in drawing FIG. 11. The rotatable mounting of this spike assembly 5 to a base frame 32 of the device 1, is implemented in this example as follows: three supporting sleeves 38 are attached to the outer base frame plate 13 of the spike assembly 5 on both sides symmetrically, these sleeves 38 extending from inside of the base frame 32 to outside of the base frame 32 symmetrically on both sides of the base frame 32. To the ends of the sleeves 38, which are located outside of the base frame 32, guide rails 25 are mounted with the help of a stiffening middle base frame plate 42. There are two guide rails 25 for one spike assembly 5, one on each side of the device 1. In the accompanied example, the middle base frame plates 42 are mounted on the ends of the sleeves 38, which ends are located outside the base frame 32, with the help of bolts 43 and the guide rails 25 are mounted with the help of bolts 44 and an intermediate sleeve 46 to the middle base frame plate 42. The purpose of the intermediate sleeve 46 is to make space between the guiderail 25 and the middle base frame plate 42. Roller wheels 24, which are located outside the device 1 and mounted to the base frame 32 with the help of bolts 39, intermediate sleeves 46 and groove ball bearings 41, allow only horizontal translational motion for the guide rails 25 and thus also for the spike assemblies 5. This translational motion is implemented as follows: outside the base frame 32 is located the motion mechanism of the pricker mechanism, which comprises connecting rods 26, transfer chains 37 of a motion mechanism, this motion mechanism configured to transform the rotational motion into a translational motion of the spike assemblies 5, sprocket wheel shafts 35, camshaft sprocket wheels 31, drive shaft 33, and an electric motor 34, which is equipped with a reduction gearbox. Also in this example, the drive shaft 33 extends through the whole base frame 32 of the device 1 so that on both ends of the drive shaft 33, these ends being located outside the base frame 32, is mounted a driving sprocket wheel. Underneath the drive shaft 33 is located two sprocket wheel shafts 35, which are located aligned vertically. The sprocket wheel shafts 35 extend, as the drive shaft 33 does, through the base frame 32, and on both ends of the sprocket wheel shafts 35, these ends being located outside the base frame 32, camshaft sprocket wheels 31 are mounted. This camshaft sprocket wheel 31 is an ordinary sprocket wheel, into which a plate is mounted concentric in respect to a center bore of the ordinary sprocket wheel and there is a hole in the plate, this hole being non-concentric in respect to the center bore of the ordinary sprocket wheel. Into this hole, one end of a connecting rod 26 is mounted with the help of a slide bearing bushing. The other end of the connecting rod 26 is mounted to a guide rail 25 of a spike assembly 5, with the help of a slide bearing bushing. So, when in operation, an electric motor 34 drives the drive shaft 33 and at the same time it drives two sprocket wheel shafts 35, which are located underneath the driveshaft 33, with the help of a transfer chain 37 of the motion mechanism, which transforms rotational motion into a translational motion of the spike assemblies 5. This means that the spike assemblies 5 move back and forth in a horizontal direction inside the device 1 with the help of connecting rods 26. This motion mechanism is symmetrical in the accompanying example embodiments on both sides of the device 1, but it could be of course positioned on only one side of the device 1.

According to one non-limiting example of an embodiment of the invention, the transfer chain 37 is a transfer chain for the motion mechanism, which transforms the rotational motion of the drive shaft to translational motion of the spike assemblies.

In the example shown in drawings FIG. 8 to FIG. 11, spike assemblies 5 positioned on different sides of a through-passing honeycomb frame 17 are assembled using the same components, although they differ from each other so that one of the spike assemblies 5 is turned 180 degrees upside down.

As an end result the spikes 11 hit the same area of the frame 17 height wise during the pricking due to the dimensioning of these parts.

Also, the example embodiment of the invention shown in drawings FIG. 8 to FIG. 10 is positioned under a set of uncapping blades. This example also functions without the uncapping blades or, on the other hand, the pricking mechanism could be positioned underneath, over, in front, in the backside of, or on the side of some other type of uncapping mechanisms depending on in which direction the honeycomb frame 17 transfer mechanism of a device 1, which is consistent with any example of an embodiment of the invention, is implemented to function.

Example 1

According to one example of an embodiment of the invention, in the device 1, there is a group of spike assemblies, in which case one such group is equipped with two spike assemblies, a first spike assembly and a second spike assembly. According to one example of an embodiment of the invention, the pricker device has at least two transfer chains mounted on a same drive shaft.

Example 2

A pricking device according to one example of an embodiment of the invention is equipped with a first base frame 27. A pricking device according to another example of an embodiment, of the invention is equipped with a second base frame 32, the first and second base frames are being similar to each other when suitable. According to an example of an embodiment of the invention, a first base frame 27 is a base frame 27 of a variant embodiment of a first pricker device 1. According to an example embodiment of the invention a second base frame 32 is a base frame 32 of a variant of embodiment of a second pricker device 1. According to an example embodiment of the invention, both a first base frame 27 and a second base frame 32 are used in a suitable part.

Example 3

In an example embodiment, for the wax cap pricking mechanism, the movement providing mechanism is implemented by sliding sleeves, connecting rods, and rotating shafts, the rotating shafts connected rotatably by the shafts to sprocket wheels to form an eccentric mechanism. A transfer chain, that moves the eccentric mechanism, is connected to the sprocket wheels as follows: a main shaft extends throughout the pricking device acting as a drive shaft, to which the driving sprocket wheels are connected for movement to both sides of the device, outside the device's base frame, and, in addition, for moving the transfer mechanism of the honeycomb frames, driving sprocket wheels are connected to said main shaft, inside of the base frame, symmetrically on both sides of the device. This way only one electric motor moves both mechanisms, when one main shaft operating drive shaft being rotated.

Example 4.

A honeycomb frame wax cap pricking device according to an embodiment of the invention is suitable for use in a hardware configuration, which provides a honey handling system, for example such as a honey extraction line to sling honey from the honeycomb frames and/or a pricking line for handling honeycomb frames. Such a honey handling system comprises at least one honeycomb wax cap pricking device according to an embodiment of the invention. An embodied honeycomb frame wax cap pricking device is naturally combinable as a part of the honey handling line and as a part of a decapping line, for example.

Example 5.

In an example embodiment according to a preferred embodiment presented in FIGS. 8-11, it is possible to connect the frame transfer chain and the pricking mechanism transfer chain to a same driving shaft, but in this case, if the frame is pricked by one handling/processing course many times, this can be implemented so that there is a sliding mechanism assembled in connection to the frame transfer mechanism that when being activated, only the frame pricking mechanism transfer chain moves the frame pricking mechanism, but simultaneously the movement of the transfer mechanism of the frame transfer mechanism does not lead to the frame transfer mechanism movement.

According to a particular embodiment, the frame transfer mechanism has a slipping facility, so that a honeycomb frame can be pricked many times in one processing event of the honeycomb frame.

The invention claimed is:

1. A honeycomb frame wax cap pricking device (1), comprising:
a base frame; and
a movement mechanism, including one or more spike assemblies (5),
wherein said movement mechanism further includes a rotatable eccentric mechanism implemented by a camshaft mechanism located on an exterior of the base frame that transforms a rotational motion of the movement mechanism into a translational motion of spikes of the spike assemblies (5) for pricking a honeycomb frame (17).

2. The honeycomb frame wax cap pricking device (1) according to claim 1, wherein the movement mechanism is driven in rotation by a driving shaft (14) that also drives a transfer chain (18) for transporting the honeycomb frame (17) through an interior of the base frame.

3. The honeycomb frame wax cap pricking device (1) according to claim 2, wherein when the transfer chain (18) moves exactly one frame cycle forwards, the eccentric mechanism rotates exactly one cycle.

4. The honeycomb frame wax cap pricking device (1) according to claim 1, wherein each of the spikes of the one or more spike assemblies (5) is mounted to a spring (12) to form a spike part that is compressible from one side and incompressible for penetrating into a honeycomb of the honeycomb frame (17).

5. The honeycomb frame wax cap pricking device (1) according to claim 1, wherein the one or more spike assemblies (5) comprise a heating mechanism.

6. The honeycomb frame wax cap pricking device (1) according to claim 1, wherein the eccentric mechanism comprises connecting rods (26), supporting sleeves (38), guide rails, a middle base frame plate (42), roller wheels (24), camshaft sprocket wheels (31), a transfer chain (37), a driving shaft (33), sprocket wheel shafts (35), bearings (41), and pins (39) located at least at one side of the exterior of the base frame (32).

7. A honey handling system that comprises a honeycomb frame wax cap pricking device according to claim 1.

8. A honeycomb frame wax cap pricking device (1), comprising:
a base frame; and
a movement mechanism including one or more spike assemblies (5),
wherein said one or more spike assemblies (5) comprise a plurality of spikes (11), a plurality of springs (12), an inner base plate (10), and an outer base plate (13), and wherein the movement mechanism is a rotatable eccentric mechanism comprising shafts (3), sprocket wheels (7), a driving sprocket wheel (9), a transfer chain (8) that transmits motion from the driving sprocket wheel (9) to the sprocket wheels (7), grooved ball bearings (21), sliding sleeve joints (6), and connecting rods (20) located at least on one side of an exterior of the base frame (27), and wherein said rotatable eccentric mechanism includes a camshaft mechanism located on the exterior of the base frame that transforms a rotational motion of the movement mechanism into a translational motion of the spikes of the spike assemblies (5) for pricking a honeycomb frame (17).

9. A honey handling system that comprises a honeycomb frame wax cap pricking device according to claim 8.

10. A honeycomb frame wax cap pricking device (1), comprising:

a movement mechanism including at least one spike assembly (5), said spike assembly (5) including a plurality of spikes (11), a plurality of springs (12), an inner base plate (10), and an outer base plate (13), wherein a rotating movement of the movement mechanism of the spike assembly (5) is transformed, by a rotatable eccentric mechanism located on an exterior of the base frame, into a reciprocating translational movement of the spikes of the spike assembly (5), the eccentric mechanism comprising at least connecting rods (26), supporting sleeves (38), guide rails, a middle base frame plate (42), roller wheels (24), camshaft sprocket wheels (31), a transfer chain (37), a driving shaft (33), sprocket wheel shafts (35), bearings (41), and pins (39), at least at one side of the exterior of the base frame (32), the spike assembly (5) configured to cause, when in operation, the spikes (11) to puncture a honeycomb of a honeycomb frame (17) without scraping effect all the wax caps of the honeycomb frame (17) simultaneously and once during each rotation cycle of the eccentric movement mechanism.

11. A honey handling system that comprises a honeycomb frame wax cap pricking device according to claim 10.

12. The honeycomb frame wax cap pricking device (1) according to claim 10, wherein the movement mechanism is driven in rotation by a driving shaft (14) that also drives a transfer chain (18) for transporting the honeycomb frame (17) through an interior of the base frame.

13. The honeycomb frame wax cap pricking device (1) according to claim 10, wherein each spike of the spike assembly (5) is mounted to a spring (12) to form a spike part that is compressible from one side and incompressible for penetrating into the honeycomb of the honeycomb frame (17).

14. The honeycomb frame wax cap pricking device (1) according to claim 10, wherein the spike assembly (5) comprises a heating mechanism.

* * * * *